(12) United States Patent
Cocchi et al.

(10) Patent No.: US 11,617,377 B2
(45) Date of Patent: Apr. 4, 2023

(54) STIRRING UNIT, MACHINE COMPRISING THE STIRRING UNIT AND METHOD FOR MAKING LIQUID OR SEMI-LIQUID FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

(*) Notice: Subject to any disclaimer, the term of this patent is extended or adjusted under 35 U.S.C. 154(b) by 349 days.

(21) Appl. No.: 16/862,091

(22) Filed: Apr. 29, 2020

(65) Prior Publication Data
US 2020/0352193 A1    Nov. 12, 2020

(30) Foreign Application Priority Data
May 9, 2019 (IT) .......................... 102019000006698

(51) Int. Cl.
*A23G 9/22* (2006.01)
*A23G 9/12* (2006.01)
(Continued)

(52) U.S. Cl.
CPC .............. *A23G 9/224* (2013.01); *A23G 9/12* (2013.01); *A23G 9/28* (2013.01); *B01F 27/091* (2022.01);
(Continued)

(58) Field of Classification Search
CPC .............. B01F 27/703; B01F 35/3204; B01F 27/091; B01F 27/1152; B01F 27/13;
(Continued)

(56) References Cited

U.S. PATENT DOCUMENTS

| | | | | |
|---|---|---|---|---|
| 1,519,746 A | * | 12/1924 | Valerius | A23G 9/163 366/296 |
| 1,692,963 A | * | 11/1928 | Thompson | A23G 9/16 366/296 |
| 2,735,276 A | * | 2/1956 | Thompson, Jr. | A23G 9/224 366/296 |

(Continued)

FOREIGN PATENT DOCUMENTS

| | | | | |
|---|---|---|---|---|
| EP | 335096 A2 | * | 4/1994 | .......... B01F 7/00208 |
| EP | 2140768 A1 | | 1/2010 | |

(Continued)

OTHER PUBLICATIONS

Google machine translation for "EP-335096-A2" (Year: 1994).*
Google machine translation for "JP-2001178371-A" (Year: 2001).*
Italian Search Report dated Jan. 21, 2020 from counterpart Italian App No. IT 2019000006698.

*Primary Examiner* — Charles Cooley
(74) *Attorney, Agent, or Firm* — Shuttleworth & Ingersoll, PLC; Timothy Klima

(57) ABSTRACT

A stirring unit of a machine for making liquid or semi-liquid food products, including: a first base element rotatable about a first axis and having a plurality of first mixing vanes and a plurality of scraping appendages connected to the mixing vanes; a first actuator, connected to the base element to set it in rotation about the first axis, a second base element rotatable about a second axis and having a second mixing vane; a processing container forming a processing chamber for processing a base product and in which the first base element and the second base element are mounted; a second actuator, connected to the second base element to rotate it, the first base element and the second base element being configured to rotate independently of each other and the first actuator and the second actuator being configured to be activated independently of each other.

16 Claims, 6 Drawing Sheets

(51) Int. Cl.
*A23G 9/28* (2006.01)
*B01F 35/32* (2022.01)
*B01F 27/706* (2022.01)
*B01F 27/091* (2022.01)
*B01F 27/703* (2022.01)
*B01F 27/704* (2022.01)
*B01F 101/13* (2022.01)

(52) U.S. Cl.
CPC .......... *B01F 27/703* (2022.01); *B01F 27/704* (2022.01); *B01F 27/706* (2022.01); *B01F 35/3204* (2022.01); *B01F 2101/13* (2022.01)

(58) Field of Classification Search
CPC .... B01F 27/192; B01F 27/70; B01F 2101/06; B01F 27/092; B01F 27/113; B01F 27/706; B01F 35/20; B01F 2101/13; B01F 27/19; B01F 27/704; B01F 27/705; A23G 9/224; A23G 9/12; A23G 9/28; A23G 9/08; A23G 9/22; A23G 9/281; A23G 9/16; A23G 9/228
USPC ............ 366/309–313, 293–296; 62/342, 343
See application file for complete search history.

(56) References Cited

U.S. PATENT DOCUMENTS

| | | | | |
|---|---|---|---|---|
| 3,214,147 | A | * | 10/1965 | Wakeman ............ A23G 9/224 366/294 |
| 3,679,183 | A | * | 7/1972 | Bachofen ............ B01F 27/704 366/280 |
| 3,937,446 | A | * | 2/1976 | Feger .................... B01F 27/704 366/66 |
| 4,900,158 | A | * | 2/1990 | Ugolini ................ B01F 27/726 366/144 |
| 2014/0169120 | A1 | * | 6/2014 | Brown ................. B08B 9/0813 366/138 |
| 2018/0098554 | A1 | * | 4/2018 | Cocchi .................. A23G 9/222 |
| 2020/0253235 | A1 | * | 8/2020 | Cocchi .................. A23G 9/28 |
| 2022/0394996 | A1 | * | 12/2022 | Lazzarini ............... F25B 39/02 |

FOREIGN PATENT DOCUMENTS

| | | | | |
|---|---|---|---|---|
| EP | 3050616 A1 | | 8/2016 | |
| FR | 2216011 A1 | | 8/1974 | |
| FR | 2218133 A1 | | 9/1974 | |
| GB | 2232363 A | * | 12/1990 | ............ A01K 5/002 |
| JP | 2001178371 A | * | 7/2001 | |
| WO | WO-2016091634 A1 | * | 6/2016 | .......... B01F 13/1027 |

* cited by examiner

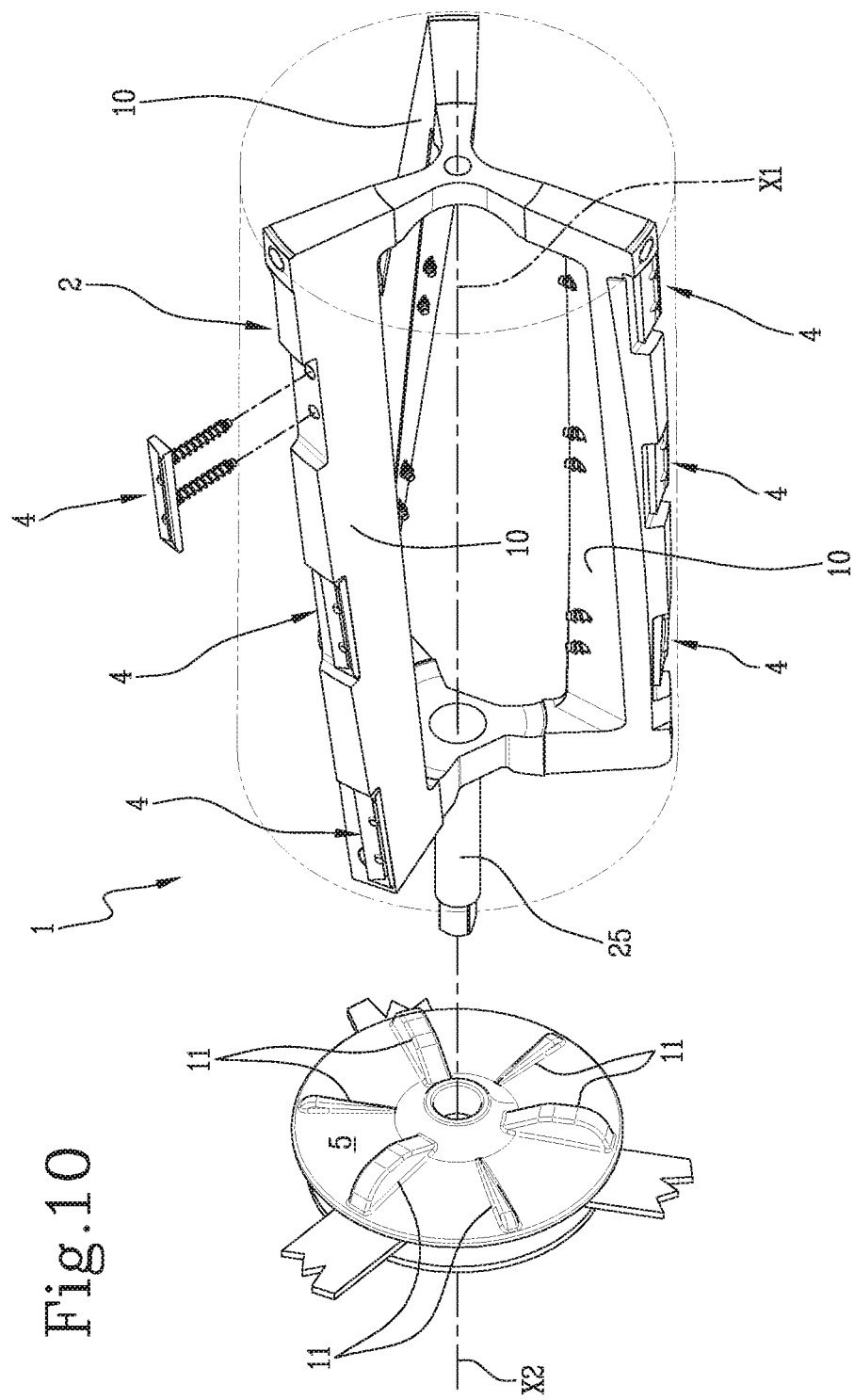

STIRRING UNIT, MACHINE COMPRISING THE STIRRING UNIT AND METHOD FOR MAKING LIQUID OR SEMI-LIQUID FOOD PRODUCTS

This application claims priority to Italian Patent Application 102019000006698 filed May 9, 2019, the entirety of which is incorporated by reference herein.

BACKGROUND OF THE INVENTION

This invention relates to a stirring unit of a machine for making and dispensing food products generically defined as liquid or semi-liquid, to a machine comprising the stirring unit and to a method for making liquid or semi-liquid products.

More specifically, by way of non-limiting example, reference is made in this description to machines for batch freezing and dispensing ice cream.

The batch freezing process is accomplished through the combined use of a refrigerating cycle and mechanical stirring.

The base food product is batch frozen at a variable temperature depending on the type of process and on the composition of the mixture itself (usually between −6° C. and −10° C.). The process involves rapidly chilling the base product being stirred, so as to obtain small-sized crystals and a uniform distribution of the different components.

Also during this process, stirring causes the base product to incorporate air, giving it the smooth, creamy texture and making it ready for consumption, taking away or storage at a suitable temperature.

The typical average amount of air incorporated in the product (overrun) is between 20% and 40%.

The machines described above are therefore necessarily configured to manage mechanical, thermal and fluid-dynamic transformation processes and the basic part of them which performs these process is an evaporation cylinder that is known, in the specific trade, as batch freezing chamber or batch freezer cylinder.

The batch freezing chamber is geometrically configured as a cylinder, made of metallic material and having cooling means distributed around the outside of (or inside the space defined by) its sidewalls and designed to reduce the temperature inside the cylinder in order to mix and chill a base product contained therein to make the finished product (ice cream).

Inside the cylinder, the machine is equipped with a motor-driven stirring unit which performs different functions: in particular, it mixes and blends the base product during the step of chilling, it promotes the incorporation of air into the base product, it constantly scrapes the inside wall of the batch freezer cylinder to remove the layer of base which chilling has caused to solidify and, lastly, it provides the pressure necessary to expel the frozen base product—that is, the finished ice cream.

The stirring element is usually configured as a body provided with two or more vanes distributed in such a way that when they rotate, they define a cylindrical surface that approximates the cylindrical inside surface of the batch freezer cylinder itself.

The length of the vanes approximates the inside length of the batch freezer cylinder.

Further, each vane is provided with elements, called "scrapers", which prevent the formation of a layer of ice by continuously scraping the inside wall of the batch freezing cylinder while the stirrer rotates.

The scrapers are made in the form of appendages attached to the vanes and movable radially with respect to the inside surface of the batch freezer cylinder.

The mixing action performed by the vanes and the scraping action performed by the scrapers may be separate, as described above, or they may be combined into a joint action performed by scraping vanes.

A particularly strongly felt need in machines of this kind is that of optimizing the functions of stirring and aerating the base product during processing so as to obtain a finished product with optimal organoleptic properties.

In effect, correct mixing and suitable aeration are essential for the obtainment of a product with optimum quality properties: in fact, mixing must allow optimum distribution and blending of the ingredients and, at the same time, must prevent the formation of blocks of ice and contribute to moving the product so that different portions of it come into contact with the chilled inside wall of the batch freezer cylinder (so as to make the product being processed as uniform as possible in terms of temperature) whilst aeration must guarantee the consistency, smoothness and texture, hence the overall structure, of the end product.

SUMMARY OF THE INVENTION

The aim of this disclosure is to meet the above mentioned need by providing a stirring unit of a machine for making liquid or semi-liquid food products, a machine comprising the stirring unit and a method for making liquid or semi-liquid products.

More specifically, the aim of this disclosure is to provide a stirring unit of a machine for making liquid or semi-liquid food products, a machine comprising the stirring unit and a method for making liquid or semi-liquid products which can optimize the mixing of the base product during processing so as to obtain a finished product having optimal organoleptic properties.

These aims are fully achieved by the stirring unit for a machine for making liquid or semi-liquid products, by the machine comprising the stirring unit and by the method for making liquid or semi-liquid products, as characterized in the appended claims.

BRIEF DESCRIPTION OF THE DRAWINGS

These and other innovative features and advantages will become more apparent from the following detailed description of preferred, non-limiting embodiments, with reference to the accompanying drawings, in which:

FIG. 10 illustrates parts of an embodiment of the stirring unit.

DESCRIPTION OF THE PREFERRED EMBODIMENTS

With reference to the accompanying drawings, the numeral 1 denotes in its entirety a stirring unit according to this invention.

Figure 1:
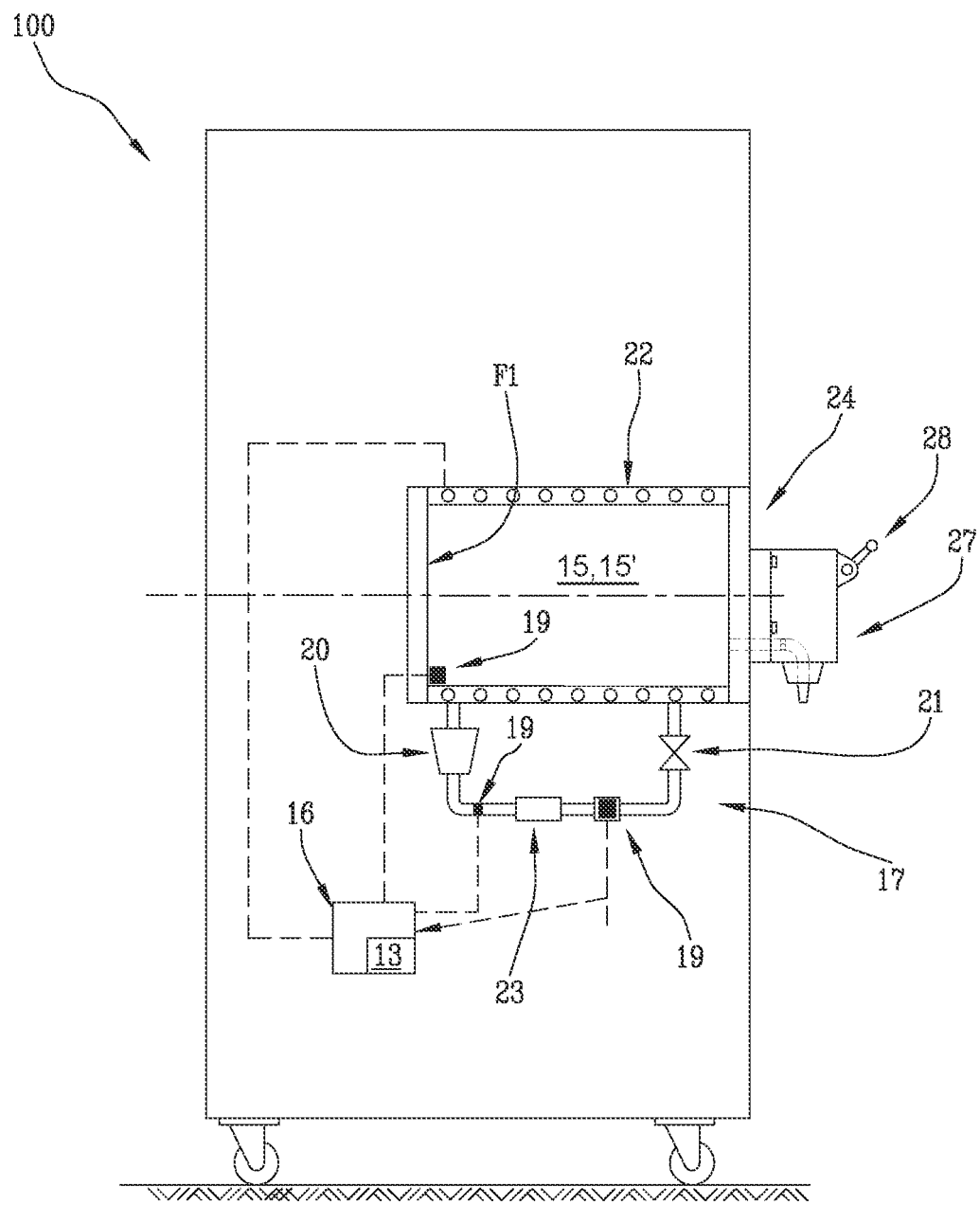
FIG. 1 shows a first embodiment of a machine for making liquid and/or semi-liquid products.

The reference 100 in FIG. 1, on the other hand, denotes a machine for making liquid or semi-liquid food products, to which the stirring unit 1 of this invention can be applied.

For simplicity, in the machine 100 of FIG. 1, no complete stirring unit 1 is shown, meaning that the machine can be equipped with all the stirring units 1 that fall within the scope of the appended claims (specifically, the stirring units 1 described in this disclosure).

Preferably, the machine 100 is adapted to make ice cream food products (gelato, soft ice cream, sorbets, chilled dessert creams).

Provided according to the invention is a stirring unit 1 of a machine 100 for making liquid or semi-liquid food products, comprising:

a first base element 2, configured to rotate about a first axis of rotation X1 and having a plurality of first mixing vanes 10, which define, in rotation, a substantially cylindrical operating surface, and a plurality of scraping appendages 4, which are connectable to the mixing vanes 10;

a first actuator 3, connected to the base element 2 to set it in rotation about the first axis of rotation X1.

According to another aspect, the stirring unit 1 further comprises:

a second base element 5, configured to rotate about a second axis of rotation X2 and having at least one second mixing vane 11 (preferably a plurality of second mixing vanes);

a second actuator 6, connected to the second base element 5 to set it in rotation about the axis of rotation X2;

a processing container 15 forming a processing chamber 15' for processing a base product and in which the first base element 2 and the second base element 5 are mounted.

The first base element 2 and the second base element 5 are configured to rotate about the first axis of rotation X1 and the second axis of rotation X2, respectively, independently of each other and the first actuator 3 and the second actuator 6 are configured to be activated independently of each other.

Preferably, the first axis of rotation X1 and the second axis of rotation X2 are parallel with each other.

Preferably, the first axis of rotation X1 and the second axis of rotation X2 coincide with each other.

In other words, rotation of the first base element 2 is completely independent of the rotation of the second base element 5 and can be activated independently according to user-selected methods.

According to another aspect, the processing container 15 is a cylinder.

In other words, the processing chamber 15' is a cylindrical chamber.

Preferably, the processing container 15 has a horizontal axis (of symmetry).

According to another aspect, the first actuator 3 comprises an electric motor and the second actuator 6 comprises a second electric motor.

Preferably, the stirring unit also comprises a driver unit 13, connected to the first actuator 3 and to the second actuator 6 to turn them on/off and to control their operation (specifically, the amplitude of rotation speed and the rotation direction).

According to another aspect, the electric motor of the first actuator 3 and/or of the second actuator 6 is a direct drive motor.

According to another aspect, the stirring unit 1 also comprises a driver unit 13 configured to drive the electric motor of the first actuator 3 and the electric motor of the second actuator 6 (according to a first program or operating configuration) so as to make the first base element 2 and the second base element 5 rotate in opposite directions.

The Applicant has found that when the first base element 2 and the second base element 5 rotate in opposite directions, the flow created inside the processing chamber 15 is both radial and axial, thus mixing the product better and preventing the formation of a compact block of ice inside the processing container 15.

According to another aspect, the driver unit 13 is configured to drive the electric motor of the first actuator 3 and the electric motor of the second actuator 6 so as to activate cyclically (according to a second program or operating configuration) only the electric motor of the first actuator 3 and both the electric motors of the first actuator 3 and of the second actuator 6. In other words, according to this operating mode, the driver unit 13 performs cycles in which only the first electric motor of the first actuator 3 is active and then both the electric motors of the first actuator 3 and of the second actuator 6 are active.

According to this operating mode, therefore, the electric motor of the second actuator 6 is activated intermittently.

Described below in more detail is the mechanical structure of the stirring unit 1.

According to an aspect, the second base element 5 comprises a substantially cylindrical element having at least one base face F1, the at least one second mixing vane 11 or second mixing vanes 11 being disposed to protrude from the at least one base face F1.

Figure 2:
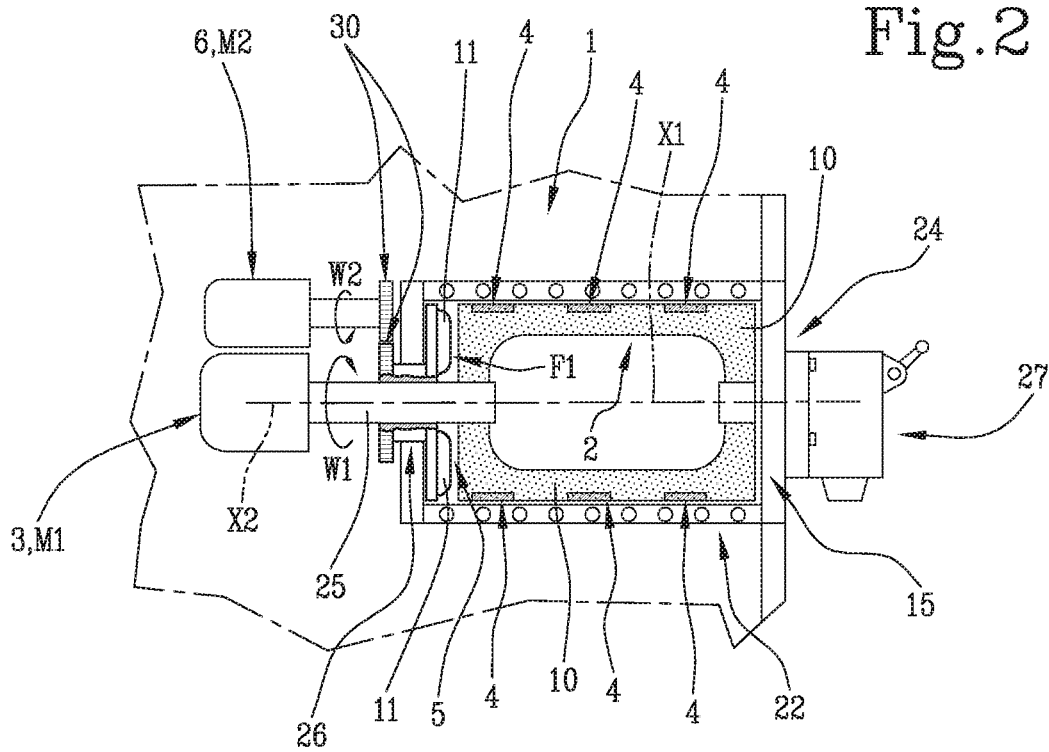
FIGS. 2 to 9 show respective schematic views of different embodiments of the stirring unit of this disclosure, applicable to the machine of FIG. 1.
Figure 3:
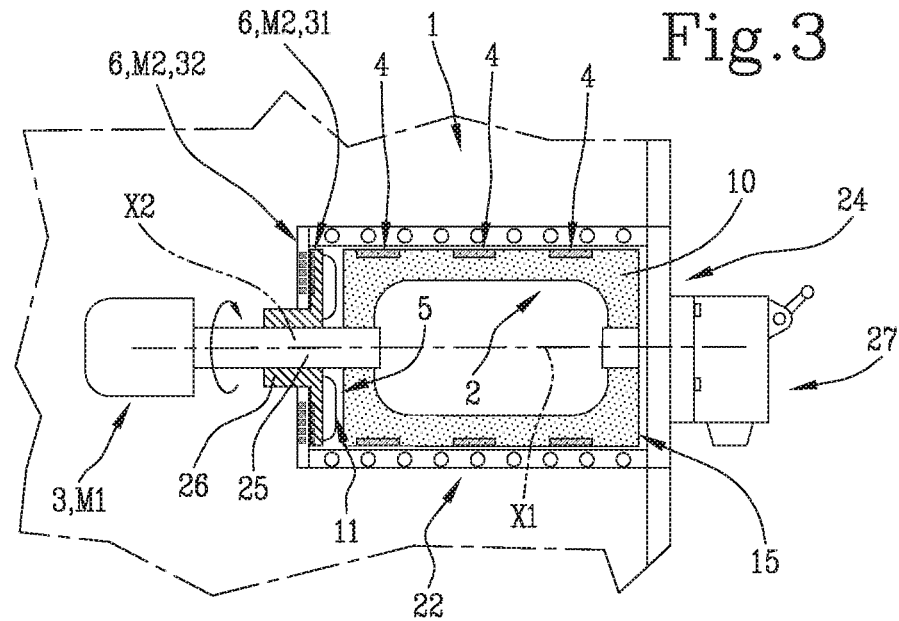
Figure 5:
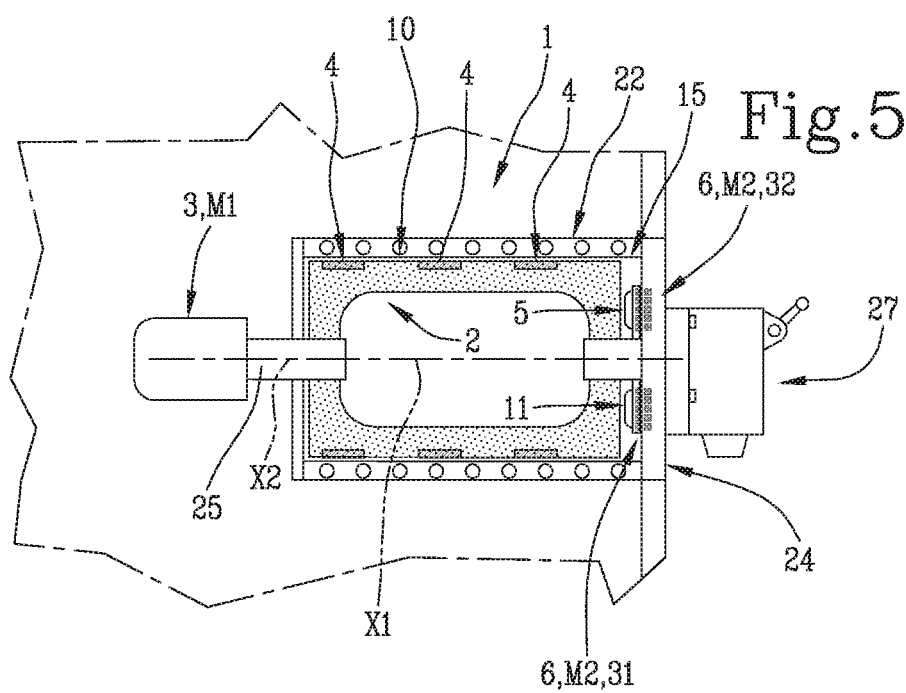

In the embodiments illustrated in FIGS. 2, 3 and 5, the second base element 5 is disposed, along the axis of rotation X1, on the outside of the substantially cylindrical operating volume of the first vanes 10.

It should be noted that the expression "operating volume" is used to mean the volume of rotation defined by the first vanes 10 rotating about the first axis of rotation X1.

In other words, in the embodiments illustrated in FIGS. 2, 3 and 5, the second base element 5 is disposed, along the direction of the first axis of rotation X1, at a position where it is not superposed on the first vanes 10.

According to another aspect, the second base element 5 is disposed on the inside of the substantially cylindrical operating surface of the first vanes 10.

According to another aspect, the second base element 5 comprises a central vane 14 extending along the second axis X2 and disposed inside the substantially cylindrical operating surface of the first vanes 10.

The central vane 14 basically has the purpose and function of preventing a compact block from forming at the centre of the product.

According to another aspect, also defined is a machine 100 for making and dispensing liquid or semi-liquid food products, comprising:

a stirring unit 1 according to any one of the preceding claims;

a thermal system 17, comprising at least a first heat exchanger 22 operatively coupled to the processing container 15.

According to another aspect, the machine 100 may comprise an (electronic) drive and control unit 16 connected to the thermal system 17 to turn it on/off.

The drive and control unit 16 may be a unit of concentrated or distributed type (meaning by "distributed" that it is composed of two or more interacting elements).

The drive and control unit 16 may comprise hardware, including a processor, and software to run on the processor.

It should be noted that the drive and control unit 16 may comprise the driver unit 13.

The driver unit 13 may be a unit of concentrated or distributed type (meaning by "distributed" that it is composed of two or more interacting elements).

The driver unit 13 may comprise hardware, including a processor, and software to run on the processor.

It should be noted that the stirring unit 1 and the machine 100 advantageously allow the product being processed to be stirred in optimum manner for optimum mixing and to prevent blocks of ice cream from forming at the centre of the stirrer.

Also advantageously, the first actuator 3 and the second actuator 6 can be driven in such a way as to create different relative speed profiles between the first mixing vanes 10 and the second mixing vanes 11 (or the second mixing vane 11).

Advantageously, activating the first base element 2 and the second base element 5 simultaneously (but not necessarily in opposite rotation directions) creates a thrusting action which effectively moves and mixes the product, which, in particular, moves masses of product in radial and axial directions to prevent the formation of blocks of ice (in particular in the central zone). In effect, thanks to the second base element 5, an additional force/thrust is applied on the base product being processed (in the same direction as the rotation direction of the first base element 2 or in the opposite direction).

That way, it is possible to generate profiles of motion of the product being processed which allow optimum mixing not only to improve mixing (in the liquid phase) but also to prevent the formation of ice cream blocks at the centre of the stirrer (in the semi-solid phase).

According to another aspect, the machine 100 comprises at least one sensor 19, preferably a plurality of sensors 19, adapted to capture one or more operating parameters of the machine 100 or of the room in which the machine is located.

The sensor 19 can, by way of non-limiting example, capture one of the following parameters: the temperature or pressure of the processing container 15 or of the heat exchanger fluid of the thermal system 17, the supply power, current or voltage of the electric motors of the first actuator 3 and/or of the second actuator 6, a parameter identifying a type of mixture being processed, the consistency of the base product being processed.

Preferably, the driver unit 13 receives the signals of the sensor/sensors 19.

It should be noted that the driver unit 13 preferably drives the first actuator 3 and the second actuator 6 as a function of the signal received from the one or more sensors 19.

The thermal system 17 is preferably a thermodynamic system.

Preferably, the thermal system comprises a circuit with a heat exchanger fluid flowing through it.

Preferably, this system comprises a compressor 20, a device 21 for reducing the pressure of the heat exchanger fluid, a first heat exchanger 22 and a second heat exchanger 23.

Preferably, the components just mentioned (20, 21, 22, 23) perform a standard vapour compression refrigerating cycle on the heat exchanger fluid.

Preferably, the first heat exchanger 22 is associated with the processing container 15, that is to say, coupled to it to allow heat to be exchanged with the product inside the processing container 15.

According to another aspect, the stirring unit 1 comprises a dispenser 27 connected to the processing container 15 to allow the product to be extracted.

The dispenser 27 is preferably provided with a control 28 that is operable to allow the product to be extracted from the processing container 15.

Described now are the embodiments illustrated in FIGS. 2-7.

FIG. 2 illustrates an embodiment of the stirring unit 1 according to the invention in which the second base element 5 is located inside the processing container 15 on the side opposite the door 24 (that is, substantially facing the base face of the processing container 15 on the side opposite the door 24).

In this embodiment, the first base element 2 is provided with a shaft 25 connecting it to the respective electric motor M1.

In this embodiment, the second base element 5 is provided with a shaft 26 connecting it to the respective electric motor M2 of the second actuator 6.

Preferably, as shown clearly in FIG. 2, the connecting shaft 26 is hollow and accommodates the connecting shaft 25 which passes freely through it.

Preferably, the stirring unit 1 of this embodiment comprises a set of gears 30 (toothed wheels) to connect the motor M2 of the second actuator 6 to the connecting shaft 26, so that motion is transferred to the connecting shaft 26.

Described below is the embodiment illustrated in FIG. 3.

In this embodiment, the stirring unit 1 differs from the embodiment of FIG. 2 in that the electric motor M2 of the second actuator 6 is a direct drive motor (preferably brushless).

It should be noted that in this embodiment, the electric motor M2 of the second actuator 6 comprises permanent magnets 31 and electrically switchable (on/off) electric coils 32.

Preferably, the permanent magnets 31 are connected (fixed) to the second base element 5.

The electric coils 32, on the other hand, are preferably fixed (coupled) to the processing container 15.

It should be noted that the electric coils 32, when on, are magnetically coupled to the permanent magnets 31.

Figure 4:
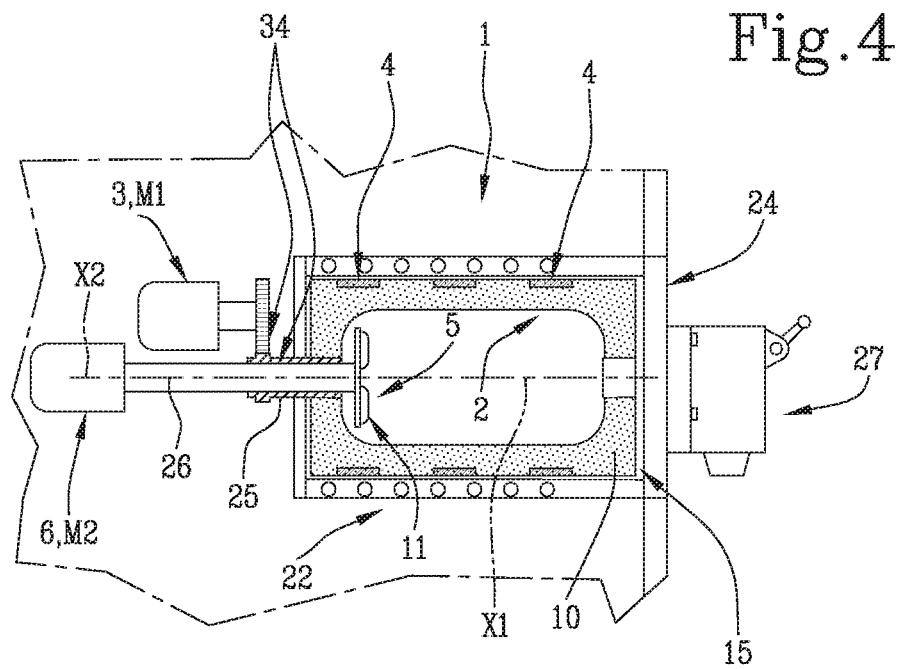

FIG. 4 shows a further embodiment of the stirring unit 1.

According to another aspect, the shaft 26 connecting the second base element 5 to the respective electric motor M2 is hollow.

According to another aspect, the hollow shaft 25 connecting the first base element 2 to the respective electric motor M1 passes freely over the shaft 26 connecting the second base element 5 to the respective electric motor M2.

According to this aspect, the shaft 25 connecting the first base element 2 to the respective electric motor M1 is preferably connected to the respective electric motor M1 by a gear unit 34.

In the embodiment illustrated in FIG. 4 (like the one illustrated in FIG. 7, which will be described in more detail below), the second base element 5 is disposed along the respective axis X1 inside the operating area of the first vanes 10 (that is, inside the cylindrical volume generated by the first vanes 10 in rotation about the first axis X1).

FIG. 5 illustrates a further embodiment.

In this embodiment, the second base element 5 is disposed inside the processing container 15 to face the door 24.

Preferably, in this embodiment (and likewise in the embodiment of FIG. 6), the door 24 (rotatably) supports the second base element 5.

According to another aspect, the electric motor M2 is preferably a brushless motor, with permanent magnets 31 integral with the second base element 5 and coils 32 integral with the door 24.

Figure 6:
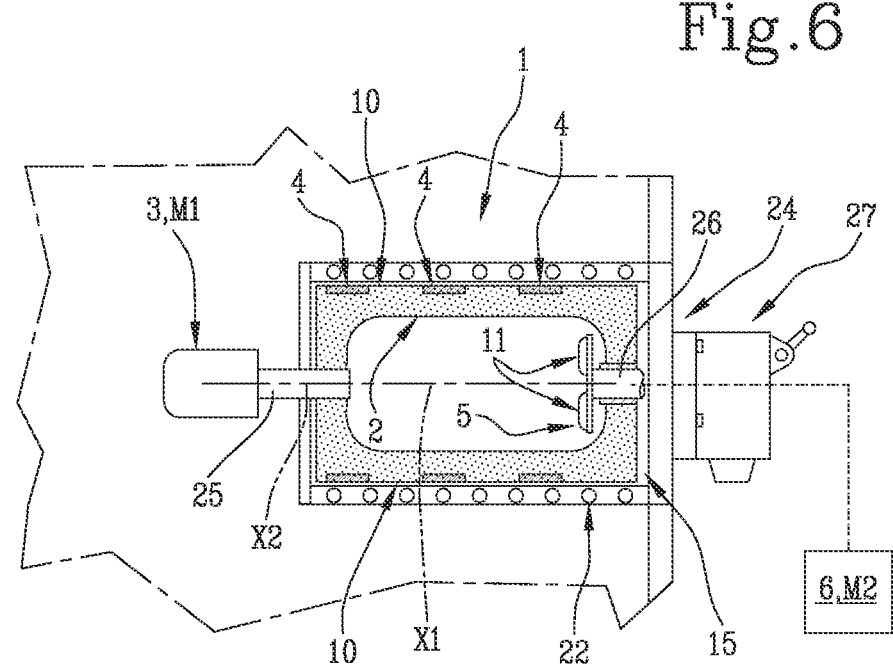

FIG. 6 illustrates a further embodiment including the shaft 26 connecting the electric motor M2 to the second base element 5.

In this embodiment, the shaft 26 preferably passes freely through the first base element 2.

It should be noted, therefore, that in the embodiment illustrated in FIG. 6, the second base element 5 is disposed along the respective axis X1 inside the operating area of the first vanes 10 (that is, inside the cylindrical volume generated by the first vanes 10 in rotation about the first axis X1). Preferably, the second base element 5 is disposed along the respective axis X1 inside the operating area of the first vanes 10 in proximity to the door 24.

Generally speaking, it should be noted that, in all of the embodiments, the electric motor M2 may be a motor of any kind; except the embodiments of FIGS. 3 and 5, where the motor is a brushless motor.

Figure 7:
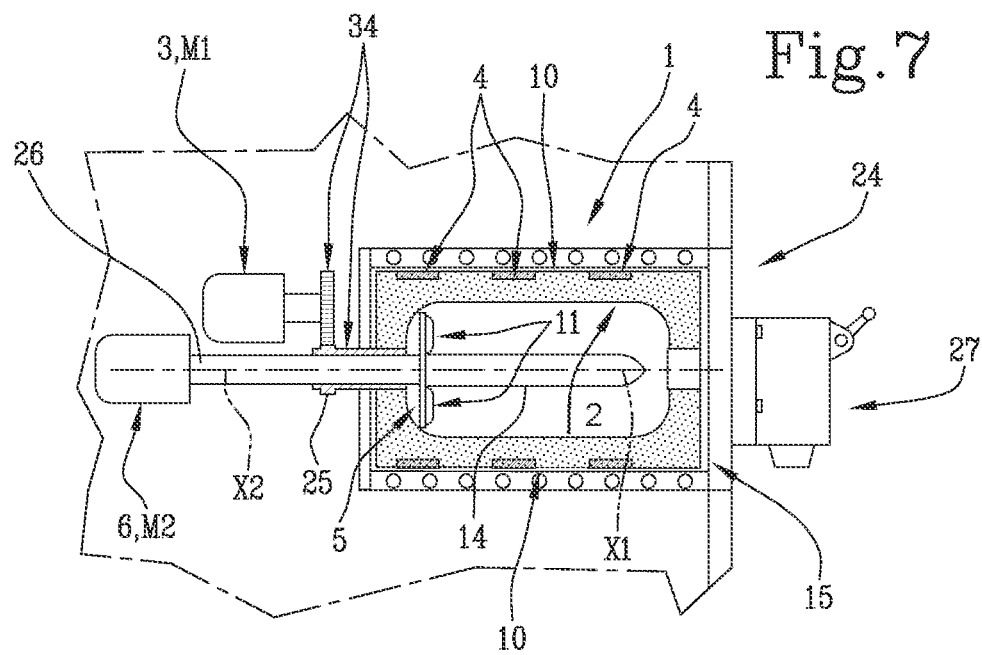

FIG. 7 is a variant of the embodiment of FIG. 4, including a central vane 14 protruding from the second base element 5. It should be noted that the central vane 14 is integral with the second base element 5, so as to be entrained in rotation.

The central vane 14 has the function of preventing compact blocks of product from forming at the centre.

It should be noted that the stirring unit 1 of the embodiments of FIGS. 4, 5 and 6 is also provided with the central vane 14.

Figure 8:
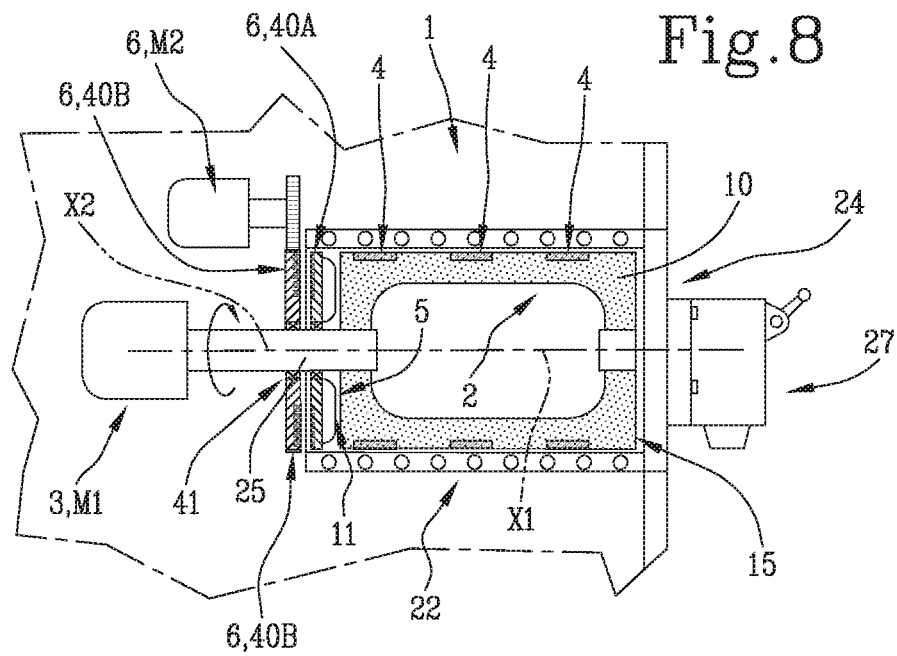
Figure 9:
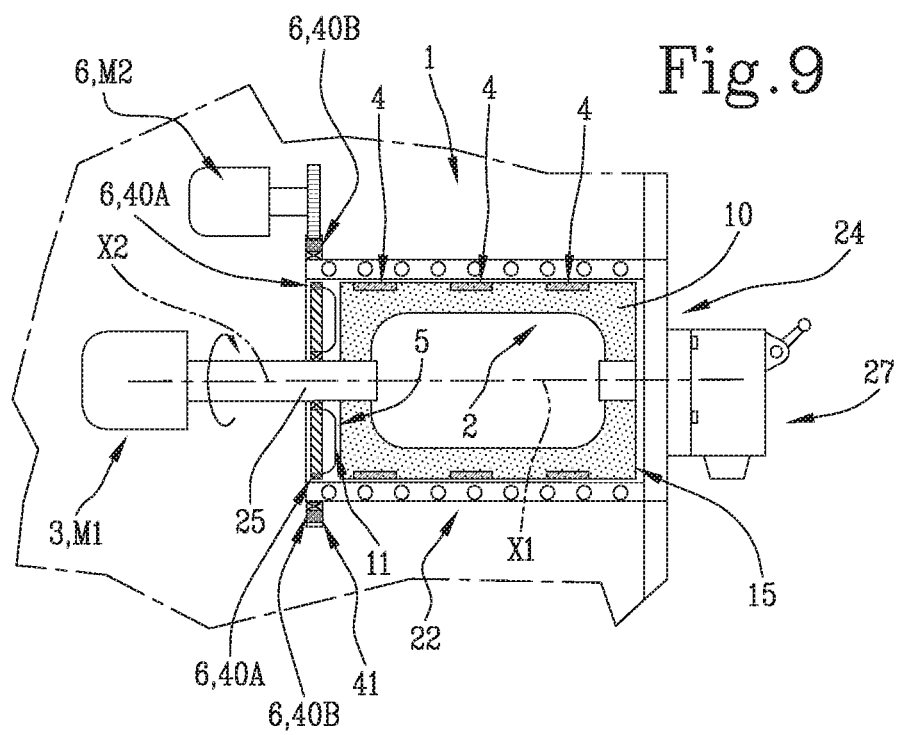

FIGS. 8 and 9 illustrate two further embodiments where the second actuator 6 comprises an electric motor M2, first permanent magnets 40A (called "driven magnets"), coupled to the second base element 5 and second permanent magnets 40B (called "drive magnets") coupled to the electric motor M2.

In this embodiment, the second permanent magnets 40B are driven in rotation by the electric motor M2 and during their rotational motion, thanks to the magnetic coupling, they in turn rotationally drive the first permanent magnets 40A (and, consequently, the second base element 5).

More preferably, the second permanent magnets 40B are supported by an element 41 (preferably disc-shaped).

Preferably, the element 41 is adapted to rotate about an axis of rotation.

The motor M2 could be an electric motor of any kind.

The embodiment of FIG. 8 illustrates the first permanent magnets 40A, disposed on the outside of the container 15, on the side of the base face of the container itself.

The embodiment of FIG. 9 illustrates the first permanent magnets 40A, disposed on the outside of the container 15, on the side of the lateral surface of the container itself.

It should be noted that in both the embodiments of FIGS. 8 and 9, the first permanent magnets 40A are physically separate from the second permanent magnets 40B (but the first permanent magnets 40A are disposed relative to the second permanent magnets 40B in such a way as to establish a magnetic coupling).

It should be noted that in both the embodiments of FIGS. 8 and 9, the first permanent magnets 40A are physically separated from the second permanent magnets 40B by a (base or side) wall of the container 15.

Preferably, in the embodiments of FIGS. 8 and 9, the second base element 5 is mounted rotatably (preferably by means of bearings) on a shaft 25 that supports the first base element 2.

FIG. 10 illustrates an example embodiment of some parts of the stirring unit 1, namely, the first base element 2 and the second base element 5.

It should be noted that in FIGS. 2-7, the stirring unit 1 is illustrated schematically (the second base element 5 and the first base element 2 might be those illustrated in FIG. 10).

Also defined according to the invention is a method for making liquid or semi-liquid products in a machine according to the foregoing disclosure, comprising the following steps simultaneously:

setting the first base element 2 in rotation in a first rotation direction W1;

setting the second base element 5 in rotation to apply an additional pushing action on the base product being processed inside the processing container 15;

turning on the thermal system 17 to exchange heat with the base product inside the processing container 15 through the first heat exchanger 22.

According to another aspect, the step of setting the second base element 5 in rotation comprises a step of setting the second base element 5 in rotation in a second rotation direction W2 opposite to the first rotation direction W1.

Advantageously, activating the first base element 2 and the second base element 5 simultaneously (but not necessarily in opposite rotation directions) creates a thrusting action which effectively moves and mixes the product, which, in particular, moves masses of product in radial and axial directions to prevent the formation of blocks of ice (in particular in the central zone). In effect, thanks to the second base element 5, an additional force/thrust is applied on the base product being processed (in the same direction as the rotation direction of the first base element 2 or in the opposite direction).

That way, it is possible to generate profiles of motion of the product being processed which allow optimum mixing not only to improve mixing (in the liquid phase) but also to prevent the formation of ice cream blocks at the centre of the stirrer (in the semi-solid phase).

It should also be noted that the method also allows adjusting the relative speed of counter-rotation of the first and the second base element so as to create different speed profiles in the product being processed.

What is claimed is:

1. A stirring unit, comprising:
   a first base element configured to rotate about a first axis of rotation and including a plurality of first mixing vanes, which define, in rotation, a substantially cylindrical operating surface, and a plurality of scraping appendages, which are connectable to the first mixing vanes;
   a first actuator including at least one motor, connected to the first base element to set the first base element in rotation about the first axis of rotation,
   a processing container forming a processing chamber in which a base product is processed,
   a second base element, configured to rotate about a second axis of rotation and including a second mixing vane;
   the first base element and the second base element being mounted inside the processing container;
   a second actuator also including the at least one motor, connected to the second base element to set the second actuator in rotation about the second axis of rotation,
   the first base element and the second base element being configured to rotate about the first axis of rotation and the second axis of rotation, respectively, independently of each other and the first actuator and the second actuator being configured to be activated independently of each other;
   the second base element including a substantially cylindrical element including an axially facing base face, the second mixing vane being disposed to axially protrude from the base face.

2. The stirring unit according to claim 1, wherein the at least one motor includes a first electric motor and a second electric motor, the first actuator comprising the first electric motor and the second actuator comprising the second electric motor, the stirring unit also comprising a driver unit, including a processor and software to run on the processor, configured to drive the first electric motor and the second electric motor to make the first base element and the second base element rotate independently of each other.

3. The stirring unit according to claim 1, wherein the second base element, when rotating about the second axis, applies a pushing action on the base product inside the processing container in addition to a pushing action applied by the first base element.

4. The stirring unit according to claim 1, wherein the first axis of rotation and the second axis of rotation coincide with each other.

5. The stirring unit according to claim 1, wherein the at least one motor includes a first electric motor and a second electric motor, the first actuator comprising the first electric motor and the second actuator comprising the second electric motor, the stirring unit also comprising a driver unit, including a processor and software to run on the processor, configured to drive the first electric motor and the second electric motor according to a first operating mode to make the first base element and the second base element rotate in opposite directions.

6. The stirring unit according to claim 1, wherein the at least one motor includes a first electric motor and a second electric motor, the first actuator comprising the first electric motor and the second actuator comprising the second electric motor, at least one chosen from the first electric motor and the second electric motor being a direct drive electric motor.

7. The stirring unit according to claim 1, wherein the at least one motor includes a first electric motor and a second electric motor, the first actuator comprising the first electric motor and the second actuator comprising the second electric motor, the stirring unit also comprising a driver unit, including a processor and software to run on the processor, configured to drive the first electric motor and the second electric motor according to a first operating mode, so as to cyclically activate 1) only the first electric motor and 2) both the first and second electric motors for a preset length of time.

8. The stirring unit according to claim 1, wherein the second base element is disposed on an exterior of the substantially cylindrical operating surface of the first mixing vanes.

9. The stirring unit according to claim 1, wherein the second base element is disposed on an interior of the substantially cylindrical operating surface of the first mixing vanes.

10. The stirring unit according to claim 1, wherein the second base element comprises a central vane extending along the second axis and disposed inside the substantially cylindrical operating surface of the first mixing vanes.

11. The stirring unit according to claim 1, wherein the at least one motor includes a first electric motor and a second electric motor, the first actuator comprising the first electric motor and the second actuator comprising the second electric motor and further comprising:
a driver unit, including a processor and software to run on the processor, configured to drive the first electric motor and the second electric motor;
a sensor connected to the driver unit and configured to provide a signal to the driver unit,
the driver unit being configured to drive the first electric motor and the second electric motor based on the signal received from the sensor.

12. The stirring unit according to claim 1, wherein the at least one motor includes an electric motor, the second actuator comprising the electric motor, first permanent magnets, coupled to the second base element and second permanent magnets operatively coupled to the electric motor.

13. A machine for making and dispensing liquid or semi-liquid food products, comprising:
the stirring unit according to claim 1;
a thermal system, comprising at least a first heat exchanger operatively coupled to the processing container;
a dispenser adapted to allow extracting a base product or a finished product from the processing container.

14. The machine according to claim 13, comprising a drive and control unit, including a processor and software to run on the processor, connected to the thermal system to turn the thermal system on and off.

15. A method for making liquid or semi-liquid products in a machine, comprising:
providing:
a machine for making and dispensing liquid or semi-liquid food products,
comprising:
a stirring unit, comprising:
a first base element configured to rotate about a first axis of rotation and including a plurality of first mixing vanes, which define, in rotation, a substantially cylindrical operating surface, and a plurality of scraping appendages, which are connectable to the first mixing vanes;
a first actuator including at least one motor, connected to the first base element to set the first base element in rotation about the first axis of rotation,
a processing container forming a processing chamber in which a base product is processed,
a second base element, configured to rotate about a second axis of rotation and including a second mixing vane;
the first base element and the second base element being mounted inside the processing container;
a second actuator also including the at least one motor, connected to the second base element to set the second actuator in rotation about the second axis of rotation,
the first base element and the second base element being configured to rotate about the first axis of rotation and the second axis of rotation, respectively, independently of each other and the first actuator and the second actuator being configured to be activated independently of each other;
the second base element including a substantially cylindrical element including an axially facing base face, the second mixing vane being disposed to axially protrude from the base face;
a thermal system, comprising at least a first heat exchanger operatively coupled to the processing container;
a dispenser adapted to allow extracting a base product or a finished product from the processing container;
and further comprising the following steps simultaneously:
setting the first base element in rotation in a first rotation direction;
setting the second base element in rotation to apply an additional pushing action on the base product being processed inside the processing container;
turning on the thermal system to exchange heat with the base product inside the processing container through the first heat exchanger.

16. The method according to claim 15, wherein the step of setting the second base element in rotation comprises a step of setting the second base element in rotation in a second rotation direction opposite to the first rotation direction.

* * * * *